US012498337B2

(12) United States Patent
Sugiyama (10) Patent No.: US 12,498,337 B2
(45) Date of Patent: Dec. 16, 2025

(54) MEASUREMENT SYSTEM AND MEASUREMENT METHOD (71) Applicant: Hitachi High-Tech Corporation, Tokyo (JP)

(72) Inventor: Akiyuki Sugiyama, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 446 days.

(21) Appl. No.: 18/128,330

(22) Filed: Mar. 30, 2023

(65) Prior Publication Data

US 2023/0314350 A1    Oct. 5, 2023

(30) Foreign Application Priority Data

Mar. 31, 2022  (JP) ................. 2022-060565

(51) Int. Cl.
*G01N 23/2251*    (2018.01)
(52) U.S. Cl.
CPC ............... *G01N 23/2251* (2013.01)
(58) Field of Classification Search
USPC ........................ 250/307, 306, 310
See application file for complete search history.

(56) References Cited

U.S. PATENT DOCUMENTS

| 5,086,477 A | 2/1992 | Yu et al. |
| 2009/0039263 A1 | 2/2009 | Matsuoka et al. |
| 2022/0179321 A1 | 6/2022 | Ma et al. |
| 2023/0194253 A1* | 6/2023 | Kagetani ............... G06T 7/0006 |

FOREIGN PATENT DOCUMENTS

| JP | 2009-43937 A | 2/2009 |
| TW | 202206950 A | 2/2002 |

OTHER PUBLICATIONS

Chinese-language Office Action issued in Taiwanese Application No. 112112126 dated Aug. 29, 2024 with partial English translation (10 pages).

* cited by examiner

*Primary Examiner* — Kiet T Nguyen
(74) *Attorney, Agent, or Firm* — Crowell & Moring LLP (57) ABSTRACT

Provided is a technology that can reduce the work burden of setting measurement conditions for each circuit pattern when the same measurement procedure is performed on a plurality of circuit patterns formed on a semiconductor material. A measurement system according to the present disclosure sets a measurement point set in a reference circuit pattern for another circuit pattern having the same circuit pattern, applies inversion or rotation to the measurement point, and performs setting on the other circuit pattern, when the circuit pattern has a circuit pattern obtained by vertically inverting, horizontally inverting, or rotating a circuit pattern the same as the reference circuit pattern.

10 Claims, 6 Drawing Sheets

|  | Contact1 | Contact2 | Contact3 |
|---|---|---|---|
| Flip Flop 1 | | | |
| Flip Flop 2 | | | |
| Flip Flop 3 | | | |
| Flip Flop 4 | | | |
| Flip Flop 5 | | | |
| Flip Flop 6 | | | |
| Flip Flop 7 | | | |
| Flip Flop 8 | | | |
| Ave | | | |
| Min | | | |
| Max | | | |

MEASUREMENT SYSTEM AND MEASUREMENT METHOD

TECHNICAL FIELD

The present disclosure relates to a technology for measuring a circuit pattern formed on a semiconductor material.

BACKGROUND ART

When designing the layout of a digital logic circuit, the overall layout may be designed by combining basic circuit patterns called standard cells. Examples of the basic circuit patterns include an AND circuit, an OR circuit, an XOR circuit, a NAND circuit, a flip-flop circuit, and a multiplexer circuit.

The standard cell defines the standard three-dimensional structure of these basic circuits. For example, the height of the basic circuit and the width of the basic circuit are standardized. The height is defined, for example, by the number of metal wiring layers extending through the basic circuit in the planar direction. The width is defined, for example, by an integral multiple of a logic gate pitch of a semiconductor element.

PTL 1 below discloses a technique for measuring a pattern formed on a semiconductor substrate with a scanning electron microscope (SEM). As an example, PTL 1 discloses that a field of view (FOV) is appropriately assigned according to a circuit type of a standard cell (FIG. 9 and paragraphs 0059 to 0064 of PTL 1).

CITATION LIST

Patent Literature

PTL 1: JP2009-043937A

SUMMARY OF INVENTION

Technical Problem

In order to ensure the reliability of measurement, it is desirable that a measurement device such as an SEM used for measuring the circuit pattern described above measures a large number of measurement targets under the same conditions. The measurement conditions here include, for example, SEM imaging conditions, measurement cursors (measurement points on a circuit pattern), and directions in which charged particle beams are deflected. These measurement conditions are set, for example, per circuit pattern.

If the position of the measurement cursor and the scanning direction are different, observation images obtained by using the position of the measurement cursor and the scanning direction may also be different. Therefore, it is desirable to set the same measurement cursor and scanning direction for the same circuit pattern. At this time, if there are a large number of the same circuit patterns, it is necessary to perform setting works by the same number of times as the number of circuit patterns. The works of setting the same measurement conditions for each of a large number of measurement targets become a large number of man-hours as the number of measurement targets increases. This increases the possibility of setting errors. That is, originally, the same observation image is to be obtained from the same circuit pattern, but, due to the setting error, it is likely that a different observation image can be obtained for each circuit pattern.

The present disclosure has been conceived in view of the technical problems described above, and an object of the present disclosure is to provide a technology capable of reducing the work burden of setting measurement conditions for each circuit pattern, when the same measurement procedure is performed on a plurality of circuit patterns formed on a semiconductor material.

Solution to Problem

A measurement system according to the present disclosure sets a measurement point set in a reference circuit pattern for another circuit pattern having the same circuit pattern, applies inversion or rotation to the measurement point, and performs setting for the other circuit pattern, when the circuit pattern has a circuit pattern obtained by vertically inverting, horizontally inverting, or rotating a circuit pattern the same as the reference circuit pattern.

Advantageous Effects of Invention

According to the measurement system according to the present disclosure, when the same measurement procedure is performed for a plurality of circuit patterns formed on a semiconductor material, the work burden of setting measurement conditions for each circuit pattern can be reduced. Other problems, configurations, advantages, and the like of the present disclosure become apparent from the following description of the embodiments.

DESCRIPTION OF EMBODIMENTS

Embodiment 1

Figure 1:
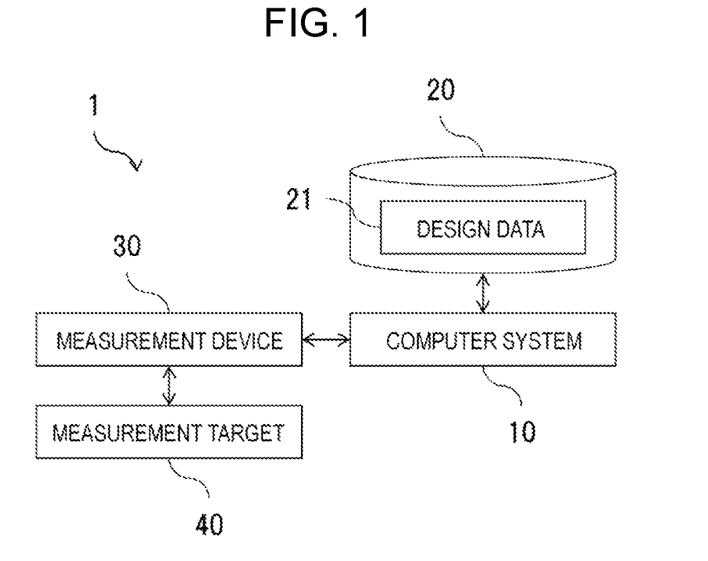
FIG. 1 is a configuration diagram of a measurement system 1.

FIG. 1 is a configuration diagram of a measurement system 1 according to Embodiment 1 of the present disclosure. The measurement system 1 is a system for measuring a measurement target 40. The measurement target 40 is, for example, a semiconductor wafer and the measurement system 1 measures the size and the like of a circuit pattern formed thereon. The measurement system 1 includes a computer system 10, a storage device 20, and a measurement device 30.

The measurement device 30 is, for example, an SEM device, measures the measurement target 40, and transmits the result thereof to the computer system 10. The computer system 10 controls an operation of the measurement device 30. The computer system 10 transmits, to the measurement device 30, data (referred to as a measurement recipe) for describing the procedure and various parameters and the like used when the measurement device 30 measures the measurement target 40, and the measurement device 30 measures the measurement target 40 according to the measurement recipe thereof. The storage device 20 stores design data 21 described below.

Figure 2:
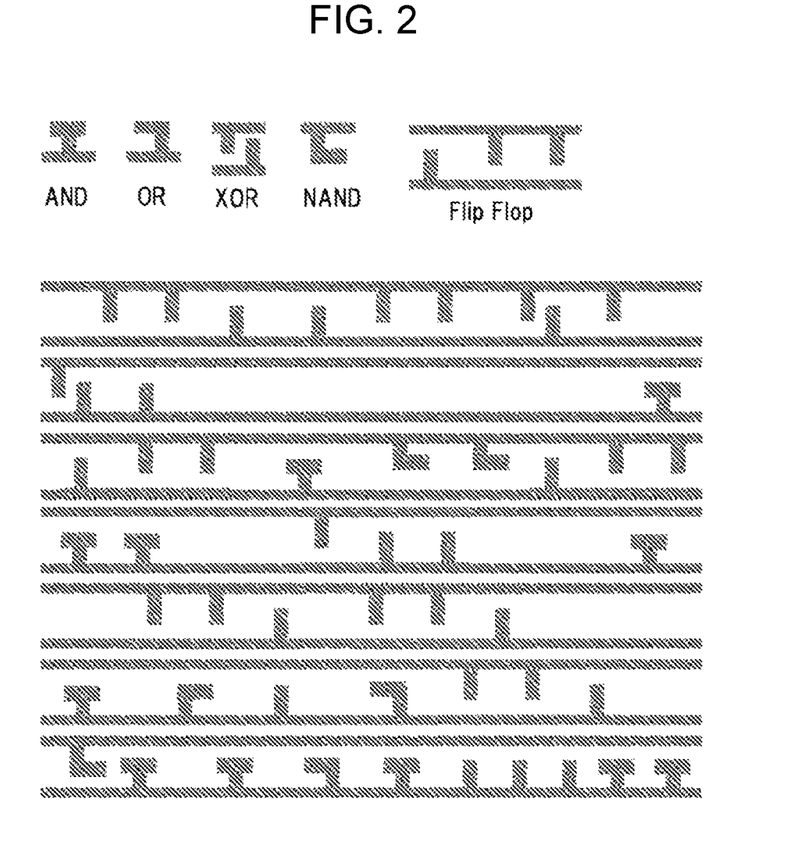
FIG. 2 is a schematic plan view illustrating an example of a circuit pattern formed on a semiconductor substrate.

FIG. 2 is a schematic plan view illustrating an example of a circuit pattern formed on a semiconductor substrate. The circuit pattern on the semiconductor substrate may be designed by combining standard cells. In FIG. 2, an AND circuit, an OR circuit, an XOR circuit, a NAND circuit, and a flip-flop circuit are defined as standard cells respectively, and circuit patterns obtained by combining these are exemplified. The design data 21 describes a structure of a circuit pattern as illustrated in FIG. 2.

Figure 3:
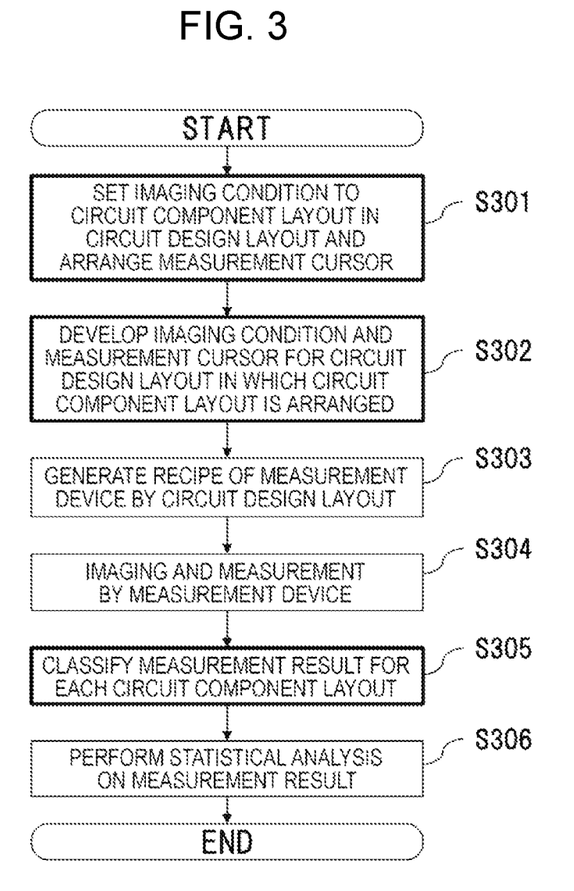
FIG. 3 is a flowchart illustrating an operation procedure of the measurement system 1.

FIG. 3 is a flowchart illustrating an operation procedure of the measurement system 1. Hereinafter, each step of FIG. 3 is described below.

(FIG. 3: Step S301)

The computer system 10 sets an imaging condition for a circuit component layout in a circuit design layout described by the design data 21 and also disposes a measurement cursor. The imaging condition is, for example, an operation condition such as an acceleration voltage of the measurement device 30. The measurement cursor is a measurement point on the circuit component. This step can be performed, for example, by a measurement operator designating the imaging condition and the measurement cursor. A specific example of this step is described below.

(FIG. 3: Step S302)

The computer system 10 sets a measurement condition (the imaging condition and the measurement cursor) set in S301 for circuit patterns of the same type in the design data 21. A specific example of this step is described below.

(FIG. 3: Steps S303 and S304)

The computer system 10 generates a measurement recipe according to results in S301 and S302 and the design data 21 (S303). The computer system 10 controls the measurement device 30 according to the measurement recipe thereof to image and measure the measurement target 40 (for example, to measure the size of the circuit pattern) (S304).

(FIG. 3: Steps S305 and S306)

The computer system 10 classifies measurement results for each type of circuit component layouts (S305). The computer system 10 performs statistical analysis on the measurement results classified in S305 (S306). A specific example of this step is described below.

Figure 4:
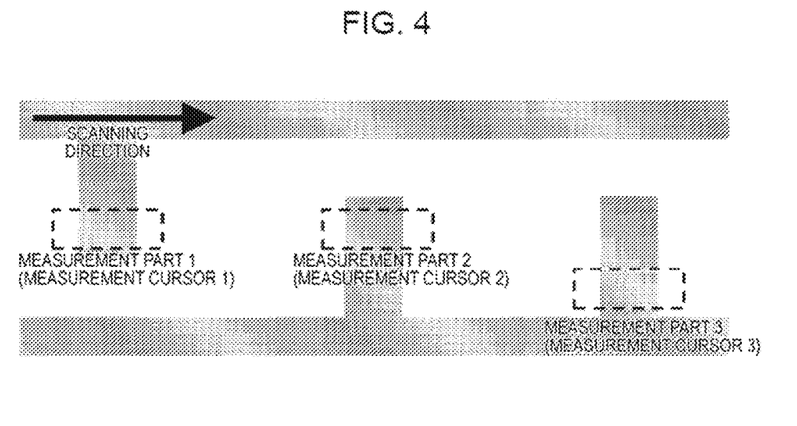
FIG. 4 is a schematic plan view of a reference circuit A defined as a standard cell.

FIG. 4 is a schematic plan view of a reference circuit A defined as the standard cell. In S301, the operator selects one of the standard cells in the design data 21 as a reference circuit pattern. The operator sets an imaging condition for the reference circuit pattern and also sets the measurement cursor and a scanning direction of a charged particle beam. The reference circuit pattern may be used for applying the same imaging condition/measurement cursor/scanning direction to another circuit pattern having the same circuit pattern in the design data 21. Therefore, the standard cell is typically suitable as the reference circuit pattern. In the description below, it is assumed that the operator selects the circuit pattern of FIG. 4 in S301 as the reference circuit pattern.

The measurement cursor is a planar area having a certain size, and thus the scanning direction is set when the measurement device 30 scans the area (for example, scans the irradiation position of the electron beam used for measurement). In S301, the operator also sets the scanning direction in the reference circuit pattern. In the example of FIG. 4, the scanning direction is set so that the measurement position is scanned from the upper left to the right, and a row below by one is scanned from the left end to the right when the scanning reaches the right end. The scanning direction is also used in the measurement recipe.

Parts with characteristic shapes are suitable as the measurement cursors. In FIG. 4 (and the following example), a planar position of the contact hole (a position on the circuit plan view) is set as the measurement cursor. The contact hole penetrates through the inner layer of the circuit substrate and is used to form a part that is in electrical contact with a metal wiring layer, another semiconductor device, or the like along the way. In FIG. 4, three contact holes are set as the measurement cursors.

Figure 5:
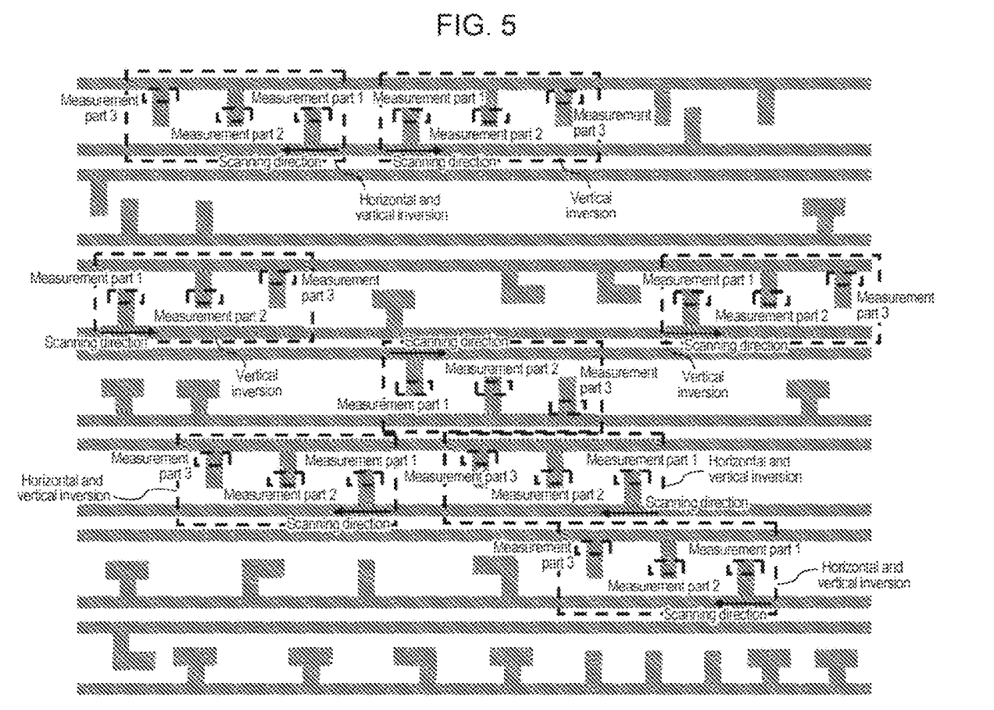
FIG. 5 is a plan view illustrating how measurement cursors and a scanning direction set in a reference circuit pattern are applied to other circuit patterns.

FIG. 5 is a plan view illustrating how the measurement cursors and the scanning direction set in the reference circuit pattern are applied to other circuit patterns. The computer system 10 in S302 sets imaging conditions, measurement cursors, and scanning directions the same as those of the reference circuit pattern for other circuit patterns having the same circuit pattern as the reference circuit pattern. In FIG. 4, three measurement cursors are set, and it is designated that the charged particle beam is deflected from the upper left to the lower right. Therefore, the same measurement cursors and the same scanning directions are set for other circuit patterns as well.

However, depending on the circuit layout, the reference circuit pattern may be inverted vertically/horizontally/vertically and horizontally and then disposed in a plane (vertical and horizontal inversion is equivalent to rotation in 180 degrees). Therefore, the computer system 10 applies the inversion to each of the position of the measurement cursor and the scanning direction and then sets measurement cursors and scanning directions for other circuit patterns. For example, the flip-flop circuit in the upper left of FIG. 5 is obtained by vertically and horizontally inverting the circuit pattern of FIG. 4, and thus the position of the measurement cursor in the above-mentioned flip-flop circuit is also vertically and horizontally inverted, so the scanning direction is also vertically and horizontally inverted (the electron beam is deflected from lower right to upper left). Similarly, for the vertical inversion and the horizontal inversion, the inversion direction is applied to each of the position of the measurement cursor and the scanning direction.

Figure 6:
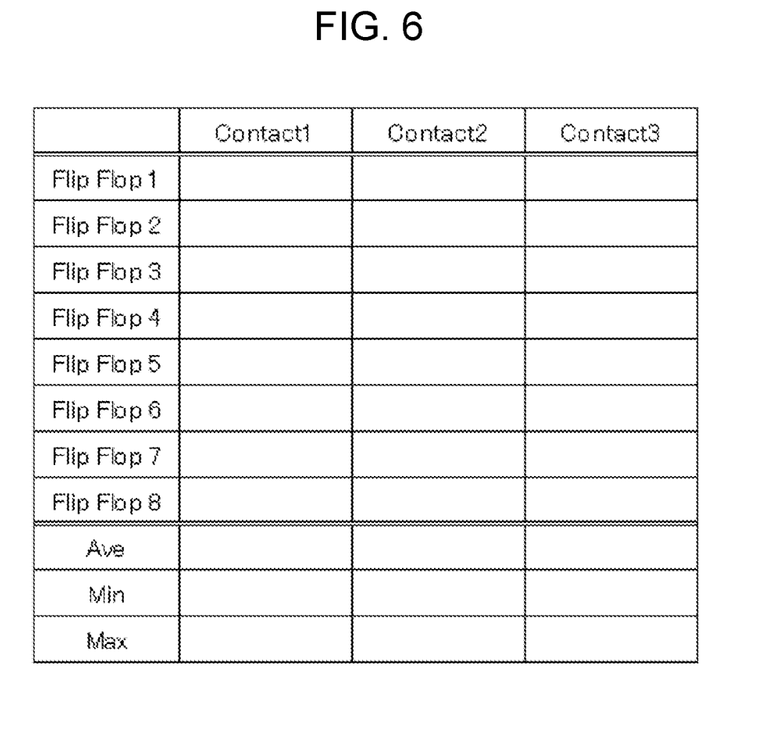
FIG. 6 illustrates a configuration example of data in which a computer system 10 classifies measurement results for each circuit component layout and stores results of statistical analysis.

FIG. 6 illustrates a configuration example of data in which the computer system 10 classifies measurement results for each circuit component layout and stores results of statistical analysis. Here, an example in a case where the flip-flop circuit described with reference to FIGS. 4 and 5 is used as the reference circuit pattern is illustrated. As illustrated in FIG. 5, there are eight reference circuit patterns (Flip Flops 1 to 8) in the design data 21. Each reference circuit pattern has three contact holes set as measurement cursors, and thus these measurement results are aggregated in the data.

Examples of statistical analysis include the following: the computer system 10 records the size of the assumed shape at the position of the measurement cursor for each reference circuit pattern/measurement cursor. The computer system 10 calculates statistical values such as average values, minimum values, and maximum values of the sizes for each combination of reference circuit patterns and measurement cursors and records the results.

Also in the related art, the measurement results are classified for each measurement cursor, and statistical values thereof are obtained, in some cases. However, in the related art, measurement cursors are set manually, so the number of classifications of measurement cursors is usually small. For example, as illustrated in FIGS. 4 to 6, three same contact hole shapes are regarded as one same type of measurement cursor and processed as one type of classification also in terms of a statistical process. On the other hand, in the present embodiment, the computer system 10 automatically sets the measurement cursor of the reference circuit pattern for another circuit pattern, so even if the number of classifications of the measurement cursors is increased, the manual work does not increase. Therefore, since statistical process for each measurement cursor as illustrated in FIG. 6 becomes possible, measurement results can be analyzed in more detail than in the related art.

Embodiment 2

In Embodiment 1, a case where the measurement cursor is set with respect to the planar position on the standard cell is described. This is, in principle, to inspect the planar pattern shape of the standard cell. Meanwhile, there are cases where another shape pattern is formed on the lower layer of the measurement cursor and it is desired to inspect that shape pattern. In Embodiment 2 of the present invention, an operation example in that case is described. The configuration of the measurement system 1 is the same as that of Embodiment 1.

Figure 7:
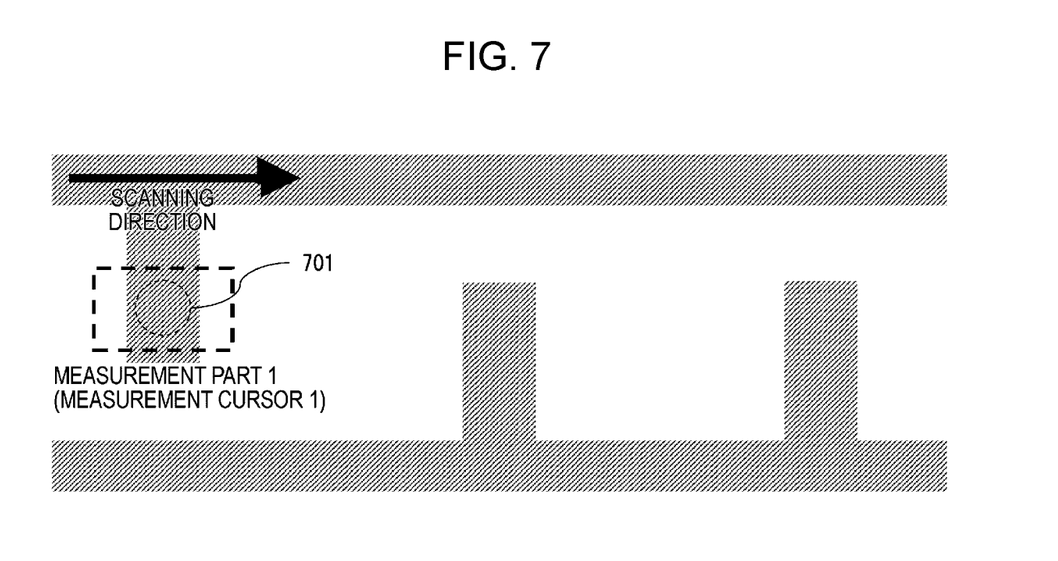
FIG. 7 is a plan view of a reference circuit A defined as a standard cell.

FIG. 7 is a plan view of a reference circuit A defined as a standard cell. The operator sets measurement cursors as in Embodiment 1. At this time, the operator may set the measurement cursor as a position for measuring a lower layer pattern 701 disposed on the lower layer of the standard cell. For example, the measurement cursor is set at a position above the lower layer pattern 701 (the circuit pattern that is visible in FIG. 7), and the fact that the lower layer pattern 701 disposed on the lower layer is to be measured is also set.

The computer system 10 generates a measurement recipe in which the position of the measurement cursor and the fact that the lower layer pattern 701 is to be measured are reflected. Furthermore, as in Embodiment 1, for other circuit patterns having the same circuit configuration, similarly, a measurement recipe showing that the lower layer pattern 701 is to be measured is generated. The measurement device 30 inspects the lower layer pattern 701 disposed on the lower layer of the measurement cursor according to the measurement recipe. Thereby, a measurement recipe for a layer different from the layer on which the standard cell is formed can be set together with the setting of the measurement cursor and the scanning direction on the standard cell.

In FIG. 7, it is described that the lower layer pattern 701 of the measurement cursor is measured. However, the measurement is necessarily limited to the lower layer, the same procedure can be used in case of measuring a pattern on a layer different from at least the layer on which the reference circuit pattern is formed.

Embodiment 3

Figure 8:
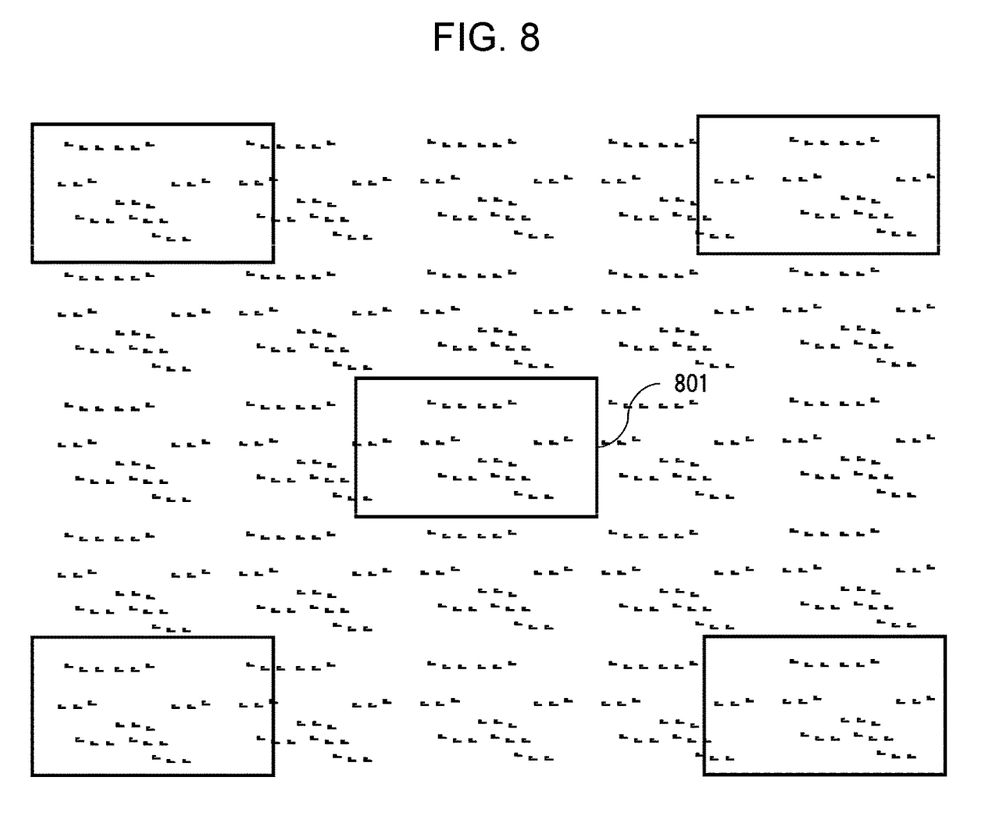
FIG. 8 is a schematic plan view illustrating how an area to be measured is selected from a circuit pattern formed on a semiconductor substrate.

FIG. 8 is a schematic plan view illustrating how an area to be measured is selected from a circuit pattern formed on a semiconductor substrate. In the above embodiments, when the measurement cursor and the scanning direction are set for the reference circuit pattern, the computer system 10 automatically sets the same measurement cursor and the same scanning direction for other circuit patterns having the same circuit configuration. As a result, a large number of measurement cursors and scanning directions are configured.

In the related art, the measurement cursors and the scanning directions are set manually, so the number thereof is limited. However, if the measurement cursors and the scanning directions are automatically set by the method of the present disclosure, the number thereof dramatically increases. As a result, the burden of the measurement process dramatically increases, and thus it may be required to narrow down measurement targets.

Therefore, in the present embodiment, the computer system 10 designates an area 801 to be measured, and generates a measurement recipe only for the designated area. The measurement device 30 also performs measurement only on that area. As a result, a large number of measurement cursors and scanning directions can be set to increase the measurement density, and a dramatic increase in measurement process can be suppressed.

Examples of the method of designating the area 801 include: (a) designating the area 801 itself to be inspected; and (b) designating an area not to be inspected and designating the rest of the area as the area 801. Furthermore, (c) the number of patterns to be inspected in each area 801 may be designated. These may be designated by the user. Otherwise, the user may designate only the ratio of the area 801 to the area of the semiconductor substrate, and the computer system 10 may automatically designate the area 801 based on the ratio.

With Respect to Modification of Present Disclosure

The present disclosure is not limited to the embodiments described above and includes various modifications. For example, the embodiments described above are described in detail in order to explain the present disclosure in an easy-to-understand manner and do not necessarily include all the configurations described. Also, a part of an embodiment can be replaced with the configuration of another embodiment. Moreover, the configuration of another embodiment can be added to the configuration of one embodiment. Moreover, a part of the configuration of each embodiment can be added, deleted or replaced with a part of the configuration of another embodiment.

In the above embodiment, the computer system 10 may provide a user interface (for example, a graphical user interface: GUI) for presenting the processing content to the user. Examples of the user interfaces include: (a) a display of the contents of the design data 21 on a screen as illustrated in FIG. 2; (b) a display of the reference circuit pattern on a screen, and a setting of the measurement cursor and the scanning direction by the user on the screen, as illustrated in FIG. 4; (c) a display of the position and the direction of the reference circuit pattern on the design data 21 on a screen as illustrated in FIG. 5; and (d) a display of the classification result and the statistical process on a screen as illustrated in FIG. 6.

Although the SEM is taken as an example of the measurement device 30 in the above embodiments, the present disclosure is not limited to the SEM. By applying the method according to the present disclosure when a measurement recipe is generated for a measurement device other than the SEM (for example, a charged particle beam device other than the SEM), the measurement device can also exhibit the same effect as the present disclosure (that is, the work burden of setting the measurement cursor and the scanning direction for each circuit pattern is reduced).

It is to be additionally mentioned that in the above embodiments, measurement includes defect inspection, analysis of defect contents, and various other similar processes in addition to the length measurement of the circuit pattern.

In the above embodiment, it is described that the scanning direction and the measurement cursor position on the reference circuit pattern are each inverted. For example, even if another circuit pattern having the same circuit configuration as the reference circuit pattern has a circuit pattern obtained by rotating the reference circuit pattern by any angle (for example, 90 degrees or 270 degrees), the method of the present disclosure can be applied. For example, another circuit pattern having a circuit configuration obtained by rotating the reference circuit pattern by 90 degrees may be set after rotation of each of the measurement cursor and the scanning direction by 90 degrees.

In the above embodiment, the measurement cursor designates the range in which the measurement device 30 deflects the charged particle beam, so it is to be additionally mentioned that the measurement cursor includes a plurality of irradiation positions of the charged particle beam.

In the above embodiments, the case of measuring the circuit pattern formed on the semiconductor substrate (semiconductor wafer) is described, but the present disclosure is not limited to the case and the present disclosure can be applied also to the case of measuring a circuit pattern once shipped as a product. That is, the present disclosure can be applied when a circuit pattern formed on any semiconductor material is measured.

REFERENCE SIGNS LIST

1: measurement system
10: computer system
20: storage device
21: design data
30: measurement device
40: measurement target

The invention claimed is:

1. A measurement system that measures a circuit pattern formed on a semiconductor material, the system characterized by comprising:
   a computer system that generates a measurement recipe for defining a procedure in which a measurement device measures the circuit pattern, characterized in that
   the computer system sets a measurement point for measurement by using the measurement recipe on a reference circuit pattern in design data in which a design layout of the circuit pattern is described,
   the computer system sets the measurement point set on the reference circuit pattern for another circuit pattern having the same circuit pattern as the reference circuit pattern in the design data,
   the computer system applies inversion or rotation to the measurement point and performs setting on the other circuit pattern, when the other circuit pattern has a circuit pattern obtained by vertically inverting, horizontally inverting, or rotating a circuit pattern the same as the reference circuit pattern, and
   the computer system generates the measurement recipe according to the measurement point set for the other circuit pattern.

2. The measurement system according to claim 1, characterized in that
   the computer system sets a direction of deflecting a charged particle beam used when the measurement device measures the measurement point, in the reference circuit pattern,
   the computer system sets the direction set in the reference circuit pattern, for the other circuit pattern,
   the computer system applies inversion or rotation to the direction and performs setting on the other circuit pattern when the other circuit pattern has a circuit pattern obtained by vertically inverting, horizontally inverting, or rotating a circuit pattern the same as the reference circuit pattern, and
   the computer system generates the measurement recipe according to the direction set for the other circuit pattern.

3. The measurement system according to claim 1, characterized in that
   the computer system sets an imaging condition used when the reference circuit pattern is imaged, and
   the computer system sets the imaging condition for the other circuit pattern to generate the measurement recipe.

4. The measurement system according to claim 1, characterized in that the reference circuit pattern is a standard cell in which a three-dimensional structure of a common circuit pattern that is commonly used between a plurality of circuit patterns formed on the semiconductor material is defined.

5. The measurement system according to claim 1, characterized in that the measurement point is a planar position of a contact hole where an electrical connection is formed between a metal line layer and a component of a semiconductor device in the reference circuit pattern.

6. The measurement system according to claim 1, characterized in that the computer system generates the measurement recipe so that measurement is performed for each combination of a type of the reference circuit pattern and the measurement point.

7. The measurement system according to claim 6, characterized in that the computer system aggregates results of measurement using the measurement recipe for each combination of the type of the reference circuit pattern and the measurement point, calculates statistical values thereof, and outputs results thereof.

8. The measurement system according to claim 1, characterized in that
   the semiconductor material has another layer pattern different from the reference circuit pattern on a layer different from a layer on which the reference circuit pattern is formed, and
   the computer system generates the measurement recipe so as to measure the other layer pattern at a planar position of the measurement point.

9. The measurement system according to claim 1, characterized in that
   the computer system designates at least a partial area of the semiconductor material, and
   the computer system sets the measurement points for the other circuit pattern that exists in the area and does not set the measurement points for the other circuit pattern that exists outside the area.

10. A measurement method of measuring a circuit pattern formed on a semiconductor material, the method characterized by comprising:

a step of generating a measurement recipe for defining a procedure in which a measurement device measures the circuit pattern, characterized in that in the step of generating the measurement recipe, a measurement point for measurement by using the measurement recipe is set on a reference circuit pattern in design data in which a design layout of the circuit pattern is described, in the step of generating the measurement recipe, the measurement point set on the reference circuit pattern is set for another circuit pattern having the same circuit pattern as the reference circuit pattern in the design data, in the step of generating the measurement recipe, inversion or rotation is applied to the measurement point and setting is performed on the other circuit pattern, when the other circuit pattern has a circuit pattern obtained by vertically inverting or rotating a circuit pattern the same as the reference circuit pattern, and in the step of generating the measurement recipe, the measurement recipe is generated according to the measurement point set for the other circuit pattern.

* * * * *